United States Patent  
Galwas et al.

(10) Patent No.: US 9,258,303 B1
(45) Date of Patent: Feb. 9, 2016

(54) METHOD OF PROVIDING REAL-TIME SECURE COMMUNICATION BETWEEN END POINTS IN A NETWORK

(71) Applicant: Cellcrypt Group Limited, Ugland house, KY (US)

(72) Inventors: Paul Anthony Galwas, St. Ives (GB); Raph Weyman, Hemel Hempstead (GB)

( * ) Notice: Subject to any disclaimer, the term of this patent is extended or adjusted under 35 U.S.C. 154(b) by 0 days.

(21) Appl. No.: 14/454,812

(22) Filed: Aug. 8, 2014

(51) Int. Cl.
*H04L 9/28* (2006.01)
*H04L 29/06* (2006.01)
*H04L 9/08* (2006.01)

(52) U.S. Cl.
CPC .......... *H04L 63/0869* (2013.01); *H04L 9/0844* (2013.01); *H04L 63/0442* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 7,796,761 B2 * | 9/2010 | Peyravian | ............. | H04L 9/0844 380/277 |
| 2003/0051140 A1 * | 3/2003 | Buddhikot | ............ | H04L 63/062 713/169 |
| 2006/0143453 A1 * | 6/2006 | Imamoto | ............... | H04L 9/3273 713/169 |
| 2006/0205388 A1 * | 9/2006 | Semple | ............... | H04L 63/0853 455/411 |
| 2007/0157026 A1 | 7/2007 | Zimmermann | | |
| 2008/0298579 A1 | 12/2008 | Abu-Amara | | |
| 2010/0325435 A1 * | 12/2010 | Park | ...................... | H04L 9/0844 713/171 |
| 2011/0305335 A1 * | 12/2011 | Negishi | ................. | H04L 9/0838 380/255 |
| 2013/0108044 A1 * | 5/2013 | Galwas | ................. | H04W 12/02 380/257 |
| 2013/0124292 A1 * | 5/2013 | Juthani | .................... | G06F 21/41 705/14.26 |
| 2014/0344582 A1 * | 11/2014 | Kato | ..................... | H04L 9/0844 713/176 |
| 2015/0222439 A1 * | 8/2015 | Bhattacharya | ........ | H04L 9/0869 713/169 |

OTHER PUBLICATIONS

Wu et al., "A New Probably Secure Authentication and Key Agreement Protocol for SIP Using ECC," International Association for Cryptologic Research, Jun. 7, 2007, pp. 1-8.
International Search Report and Written Opinion issued in PCT/US2015/042359 mailed Oct. 16, 2015.

* cited by examiner

*Primary Examiner* — Christopher Revak
(74) *Attorney, Agent, or Firm* — RatnerPrestia

(57) ABSTRACT

A method of establishing a multiplicity of shared secrets at two mutually authenticated end points in a network. The method includes authenticating a first end point in the network based on an asymmetric key pair and authenticating a second end point based on an asymmetric key pair. Upon successful authentication of the first and second end points, the end points negotiate a shared secret. Multiple shared secret keys are generated from the negotiated shared secret and session keys are computed from the multiple shared secret keys.

30 Claims, 6 Drawing Sheets

CONVENTIONAL SYSTEM

3500a
Generate first public key, first private key, second public key, second private key, DeviceID and PeerID at a predetermined time period

3500b
Generate a random number value for each call or part of call

3510
Calculate a first authentication value corresponding to the first public and private key and calculate a second authentication value corresponding to a second public and private key

3520
Initiate a mutual authentication process by an initiator end point

3530
Send the initiator end point a message in response to the mutual authentication initiation

3540
Verify the authentication value of the receiver end point

3550
Verify the authentication value of the initiator end point and generate a key exchange function

Fig. 3A

3560
Calculate variable DHssec from the key exchange function received from the receiver end point, generate key exchange function

3570
Calculate variable DHssec from the key exchange function received from the initiator end point, send second authentication value to initiator end point.

3580
Verify second authentication value of the receiver end point, send second authentication value of the initiator end point to the receiver end point, compute session keys

3590
Verify second authentication value of the initiator end point, compute session keys

FIG. 3B

METHOD OF PROVIDING REAL-TIME SECURE COMMUNICATION BETWEEN END POINTS IN A NETWORK

FIELD OF THE INVENTION

The present disclosure relates to providing voice and other real-time communications of digital data over networks that are bandwidth-limited and between resource-constrained devices such as mobile phones. In particular, the present disclosure relates to providing secure real-time communication over a network in a bandwidth efficient manner.

BACKGROUND OF THE INVENTION

In bandwidth and power constrained environments, such as mobile telephony, it is important to minimize the data and complexity of processing that is required by protocols that establish secure real-time communication of data over a network.

There is an established field of real-time communications over Internet Protocol (IP) networks, which underpins widespread applications such as Voice over IP (VoIP). There are standard protocols such as Session Initiation Protocol (SIP) and Real-Time Transport Protocol (RTP) which support unencrypted real-time traffic. Secure RTP (SRTP) has been extended to encrypt real-time traffic. However, none of these protocols are well suited for bandwidth limited environments.

FIG. 1 shows a conventional system using the above-mentioned protocols. A mobile end point (110) communicates over a wireless network (100) with an IP network (200). The IP network contains a SIP stateful proxy (210), a second SIP stateful proxy (211) and a SIP stateless proxy (220). A mobile end point (110) invites another end point (120) to establish a call, using the SIP protocol, by passing messages to (210), (220) and (211). The SIP stateful servers exchange the final call-setup SIP messages by communicating directly between each other. When the call is set-up, each end point communicates directly with the other and the end points send the real-time data to each other without encryption using RTP, or encrypted using SRTP.

SRTP supports symmetric VoIP data encryption with Advanced Encryption Standard (AES). To encrypt a call using SRTP, the end points must first obtain a shared secret encryption key. Then they each use that key to encrypt the voice data that passes between them.

In some conventional systems, each end point selects the session key from a list of keys that have previously been loaded into each end point using a secure method, which often involves physical delivery to the end point or each end point securely obtains the session key over the network from a key server. Both scenarios are bandwidth intensive. Moreover, use of a key server constitutes an aggregated risk.

The present disclosure is directed toward, but not limited to, improving the above noted problems by providing minimal protocol messages to provide secure real-time communication in a bandwidth limited network environment.

SUMMARY OF THE INVENTION

Exemplary embodiments disclosed herein provide a method of establishing a multiplicity of shared secrets at two mutually authenticated end points in a network. The method, for example, includes generating a first public key (AA1pub), and a first private key (AA1priv) for a first algorithm (AA1), a second public key (AA2pub) and a second private key (AA2priv) for a second algorithm (AA2), a DeviceID and a PeerID.

For each call, or part of a call, exemplary embodiments provide a method to create a random number value, and calculating a first authentication value (AA1-Auth) corresponding to the first public key and the first private key and a second authentication value (AA2-Auth) corresponding to the second public key and the second private key. A receiver end point is authenticated based on the first authentication value of the receiver end point and an initiator end point is authenticated based on the first authentication value of the initiator end point, if the authentication of the receiver end point verifies.

In another exemplary embodiment, the system creates the authentication value AAn-Auth only when the user has been successfully validated using a biometric method, such as, for example, a fingerprint scan.

After the initial authentication process is performed, a key exchange function (DHeph) is generated by the receiver end point using a second algorithm (AA2), if the authentication performed by the receiver end point is successful, and a shared secret (DHssec) is calculated by the initiator end point from the key exchange function (Dheph) generated by the receiver end point. The initiator end point generates a key exchange function (Deph) using the second algorithm (AA2) and the receiver end point calculates a shared secret (DHssec) from the key exchange function generated by the initiator end point.

A second authentication of the initiator end point and the receiver end point is performed using the second authentication values calculated by the initiator end point and the receiver end point. Upon successful authentication, session keys are generated from the calculated shared secrets.

AA1-Auth and AA2-Auth can be used to establish mutual trust of different aspects of an end-point, for example, the device, user, device software, software origination or system operation. AA1-Auth can be used to authenticate the user and AA2-Auth can be used to authenticate the device.

BRIEF DESCRIPTION OF THE DRAWINGS

FIG. 3 (3A and 3B) is a flow chart illustrating an exemplary representation of mutual authentication and negotiating a shared secret.

DETAILED DESCRIPTION

The present disclosure describes a communication protocol for providing secure real-time communications in a network system. The protocol is bandwidth efficient and uses minimal data and messages to effectuate secure real time communications in the network. The protocol performs mutual authentication and generates multiple shared secrets for encrypted communications.

Figure 1:
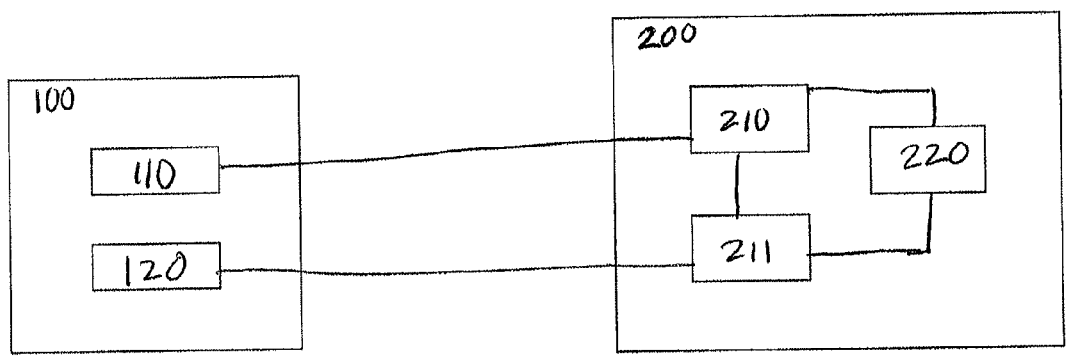
FIG. 1 is a block diagram illustrating a conventional communication system.
Figure 2:
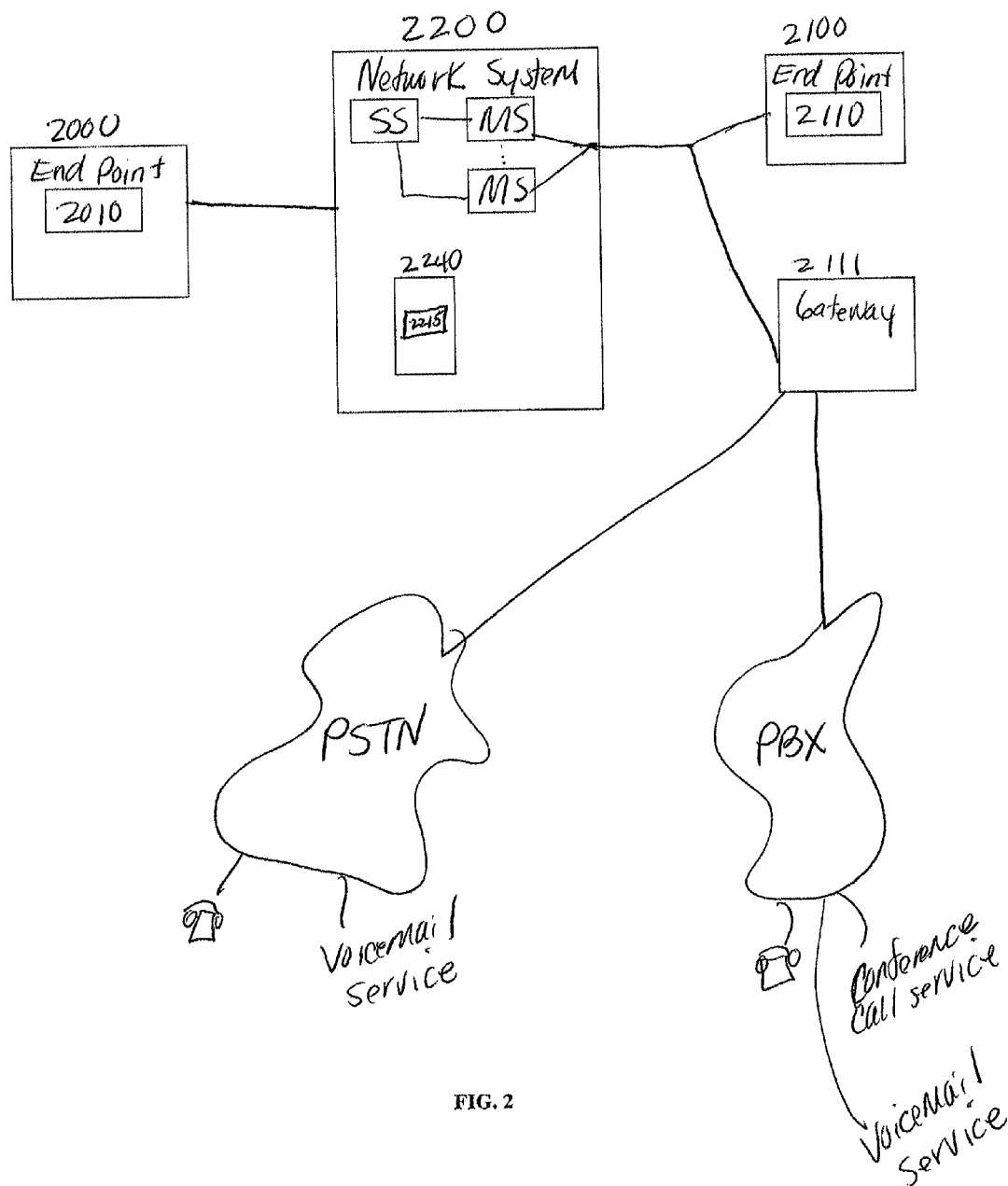
FIG. 2 is a block diagram illustrating an exemplary embodiment of a communication system as disclosed herein.

FIG. 2 is a diagram illustrating an exemplary embodiment of a communication system. The system includes end point 2010 communicating over wireless network 2000 with network system 2200, and end point 2110 communicating with the network system over wireless network 2100. The network system interconnects two end points in the communication system, and the communication system may include two or more end points.

End point 2010 can be, for example, a mobile end point which includes mobile equipment (e.g., mobile phone) equipped with encryption modules. The encryption modules provide encryption and decryption functions for voice data in real time and establish a secure communication link with another end point in the communication system. The encryption modules can be processors embedded with computer readable instructions that when executed perform encryption and decryption functions.

End point 2110 can be, for example, another mobile end point, such as end point 2010, or a gateway device, such as gateway 2111. Gateway 2111 connects a traditional phone system, such as, for example, Public Switched Telephone Network (PSTN) and Private Branch Exchange (PBX) to network system 2200. The gateway converts the PSTN or PBX telephone traffic into an IP format for transmission over an IP network. Gateway 2111 is equipped with an encryption module to facilitate encryption and decryption functions. Transparent point to point encryption is provided between end point 2010 and end point 2110, and between end point 2010 and gateway 2111.

The encryption modules may use redundant encryption schemes for session, authentication, digesting and/or key exchange. Preferred embodiments use two strong algorithms at the same time in series. The encryption of the data may be performed using any known cryptography algorithm, such as, for example, Elliptic curve Diffie-Hellman (ECDH), Rivest, Shamir and Adleman (RSA), Advanced Encryption Standard (AES), Digital Signature Algorithm (DSA), etc.

Networks 2000 and 2100 are wireless network systems, such as, for example, Global Systems for Mobile Communication (GSM), Enhanced Data Rates for GSM Evolution (EDGE), General Packet Radio Service (GPRS), 3G GSM, HSPA, UMTS, CDMA and Wi-Fi.

Network system 2200 is a wired network system, such as, for example, an Internet Protocol (IP) system. The network system may include one or more signaling servers and one or more media servers. An end point sends a request to the signaling server to make a call or send a message to another end point. The signaling server sets up the call, telling each end point to contact the same media server. The end points send the real-time data to each other through the media server. The media server uses media protocols for receiving voice data and sending it across the network.

Storage device 2240 can be implemented with a variety of components or subsystems including, for example, a magnetic disk drive, an optical drive, flash memory, or any other devices capable of persistently storing information. Storage device includes device database 2215, which contains a list of all the DeviceIDs known to the system.

The architecture shown in FIG. 2 allows for communication (e.g., data transmission, phone call, and video) between two end points or between an end point and a gateway in the system. Communications are encrypted using the protocols described below and illustrated in FIG. 3 and FIG. 4. The real-time communications between two end points or between an end point and a gateway are encrypted using one or more session keys that are derived from a shared secret known only to the end points.

As illustrated in FIG. 3, at step 3500*a*, each end point and/or gateway (e.g., an initiator end point/gateway and a receiver end point/gateway) generates, at a predetermined time, such as, for example, at installation, a first public key (AA1pub), and a first private key (AA1priv) for a first algorithm (AA1), a second public key (AA2pub) and a second private key (AA2priv) for a second algorithm (AA2), a DeviceID and a PeerID. The first public key (AA1pub), first private key (AA1priv), second public key (AA2pub) and second private key (AA2priv) can be generated by any method well known in the art.

In another exemplary embodiment, the first public key is a corresponding digital certificate (Cert-AA1(x)) for an asymmetric cryptographic algorithm (AA1) and the second public key is a corresponding digital certificate (Cert-AA2(x)) for a different asymmetric cryptographic algorithm (AA2). The digital certificates Cert-AA1(x) and Cert-AA2(x) can each be a X509 certificate that contains one or more attributes, such as, for example, DeviceID, PeerID, ID, software ID, software originator ID, system operation ID, and name, for a corresponding end point.

The first algorithm (AA1) and the second algorithm (AA2) are cryptographic algorithms. In one embodiment, the first algorithm (AA1) and the second algorithm (AA2) are used to authenticate a same parameter. In this embodiment, the first algorithm (AA1) and the second algorithm (AA2) use different cryptographic algorithms. For example, the first algorithm (AA1) can be Rivest, Shamir and Adleman (RSA) and the second algorithm (AA2) can be Digital Signature Algorithm (DSA).

In another exemplary embodiment, the first algorithm (AA1) and the second algorithm (AA2) are used to authenticate different parameters. In this embodiment, the first algorithm (AA1) and the second algorithm (AA2) use the same cryptographic algorithm.

In another exemplary embodiment, the first algorithm (AA1) is replaced by a null algorithm such that encryption with any key gives the same encrypted text as a plain text input and encryption gives the same decrypted text as the input text, and the signatures always verify.

The DeviceID of an end point is used to identify the device only to the signaling server and is created by its corresponding end point. The end point can derive the DeviceID from a hardware identifier in the end-point, such as the GSM International Mobile Equipment Identity (IMEI). Alternatively, the end point can create the DeviceID, for example using a random number generator. The DeviceiD can be delivered to the device database 2215 by an out-of-band channel.

In another exemplary embodiment, another system component generates the DeviceID and delivers it to the associated end-point and the device database 2215 by out-of-band channel.

The PeerID identifies the device to the media server and is generated using a random number generator. In another exemplary embodiment, the PeerID is derived from a public key of an asymmetric cryptographic key pair that an end point generates when it is created. The PeerID of an end point is independent of the IP address and is used to identify media messages from a corresponding end point in the communication system.

At step 3500*b*, a random number value (N) is generated for each call or part of a call. The random number value (N) is generated from a random number generator.

At step 3510, each end point (e.g., an initiator end point and a receiver end point) calculates a first authentication value (AA1-Auth) corresponding to the first public key and the first private key and a second authentication value (AA2-Auth) corresponding to the second public key and the second private key.

The first authentication value (AA1-Auth) is calculated, for example, as AA1-Auth(x)=AA1_encrypt(Nx, AA1puby)

concatenated with AA1_sign_withH1 (messages, AA1priv (x)). Messages=all sent messages(x) concatenated with all received messages(x). The subscript x identifies the protocol message sender and the subscript y identifies the protocol message receiver. AA1_encrypt is the encryption algorithm using the public key. AA1_sign_withH1 is a signature algorithm (e.g., DSA) using the private key and a digest algorithm (H1) (e.g., SHA-384).

The second authentication value (AA2-Auth) is calculated, for example, as AA2-Auth(x)=AA2-SIG(x)_withH2 (all sent messages(x) concatenated with all received messages(x)). AA2-SIG(x)_withH2 is a signature algorithm using the private key and a digest algorithm (H2). Digest algorithms H1 and H2 are different from one another.

If any of the sent messages(x) are lost, the messages are resent from a buffer. Lost messages are not recalculated.

At step 3520, an initiator end point (e.g., end point 2010) initiates a mutual authentication process by generating a message and sending the generated message to a receiver end point (e.g., end point 2110) in the communication system. The message format is, for example, [PeerID (2010), N (2010), AA1$_{pub}$ (2010)], wherein PeerID (2010) is the PeerID of end point 2010, N (2010) is the random number value generated by end point 2010 and AA1pub (2010) is the initiator's public key or corresponding digital certificate for the first algorithm (AA1).

Upon receiving the message, the receiver end point sends a message to the initiator end point, at step 3530. The message format is, for example, [PeerID(2110), N(2110), AA1$_{pub}$ (2110), AA1-Auth (2110)]. PeerID (2110) is the PeerID of end point 2110, N (2110) is the random number value generated by end point 2110 and AA1pub (2110) is the initiator's public key or corresponding digital certificate for the first algorithm (AA1). AA1-Auth (2110) is the first authentication value calculated by end point 2110.

At step 3540, initiator end point 2010 verifies the authentication value of end point 2110.

Each end point contains a trusted contact database (not shown) of trusted contacts. Each trusted contact contains for a given end point a name, CallingID, PeerID, Credential1 and optionally Credential2, where name is a user-defined string to identify the contact, CallingID can be used as a CallerID or CalleeID, and CredentialZ is AAZpub, or Cert-AAZ, and Z=1 or 2.

When a call is initiated, the caller end point (2010) (i.e., the initiator end point) generates a SetupID that identifies the request to make a call to an end point in the network (e.g. 2110)(i.e., the receiver end point), and sends a call request1 message to a signaling server (not shown) that must contain the SetupID, SessionID, CalleeID and CallerID. CalleeID is a number to identify end point (2010) and CallerID is a number to identify end point (2110).

On receiving the call request1 message, the signaling server maps the CalleeID to a DeviceID using a database and checks whether the end point has a SessionID to show that it has registered. If so, the signaling server generates a CallID which identifies the call, selects a media server and sends a call request2 message to end-point (2110) that must contain CalleeID, CallerID, MS address, where MS address is the IP address of the media server that will carry the call.

Figure 4:
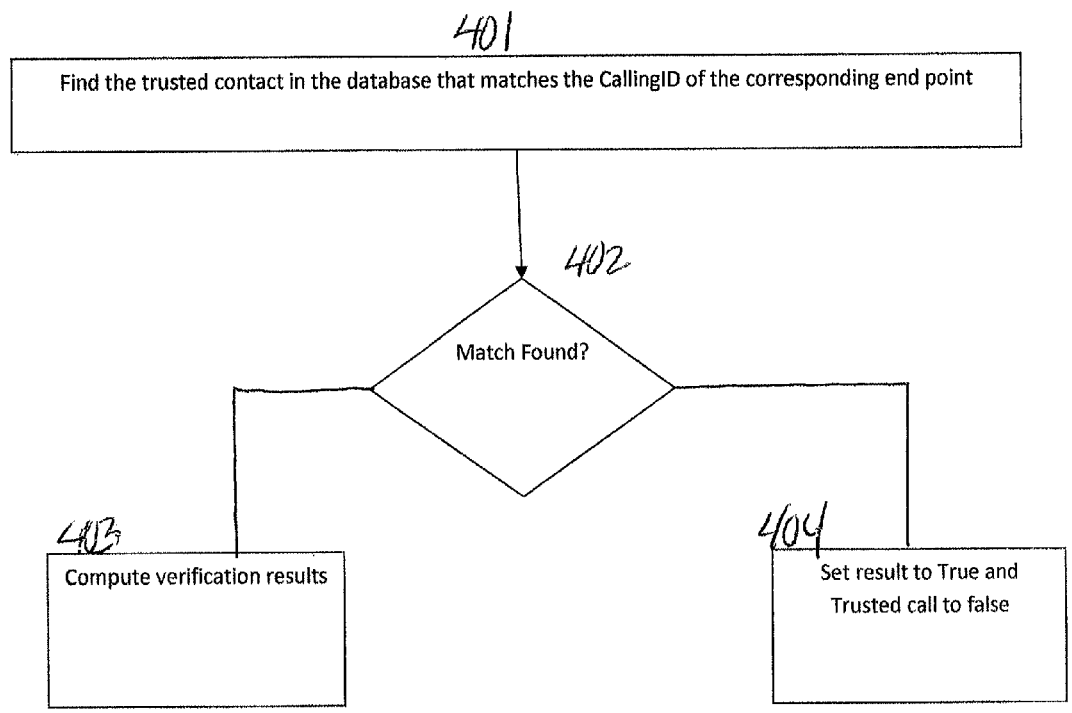
FIG. 4 is a flow chart illustrating an exemplary representation of a verification process of an authentication value.

The authentication value is verified using an algorithm, which utilizes information from the call request messages. The algorithm, as illustrated in FIG. 4, includes, for example, the following:

At step 401, if end point 2010 is the Caller (A) (i.e., the initiator end point), find the trusted contact that matches the CalleeID corresponding to end point 2010. If end point 2110 is the Callee (B) (i.e., the receiver end point), find the trusted contact that matches the CallerID corresponding to end point 2110, which is obtained from the call request2 message.

At step 402, determine if a match is found.

If a match is found, at step 403, compute the verification results as follows:
   a. If a match is found for end point B (2110),
     ResultA=(CallerID from call request2 message matches CalleeID from the trusted contact)
   b. if a match is found for end point A (2010),
     ResultA=(CalleeID matches CallerID from the trusted contact)
   c. ResultB=verify AAZ-Auth (e.g., AA1-Auth (2110)) using the CredentialZ from the trusted contact, using a standard cryptographic verification algorithm for AAZ (e.g. AA1)
   d. VerificationResultZ=ResultA AND ResultB
   e. If VerificationResultZ is TRUE, set TrustedCallZ to TRUE If no match is found, at step 404, set the verification result to TRUE and the TrustedCallX to False.

ResultX and TrustedCallX (X=A or B), VerificationResultZ (Z=1 or 2) are logical values, with values TRUE or FALSE.

If the first authentication value is verified successfully, end point 2010 sends its first authentication value to end point 2110 for verification. Otherwise the process terminates.

At step 3550, receiver end point 2110 verifies the authentication value of end point 2010 in the manner illustrated in FIG. 4. If the first authentication value is verified successfully, end point 2110 generates a key exchange function (DHeph) (e.g., diffie-hellman key exchange) using the second algorithm (AA2) and generates a message to send to end point 2010. The message format is, for example, [AA2pub (2110), Dheph(2110)]. AA2pub (2110) is the receiver's (2110) public key or corresponding digital certificate for the second algorithm (AA2). If the first authentication value does not verify successfully, the process terminates.

Upon receiving the message, end point 2010 calculates a variable DHssec from the Diffie-Hellman key exchange Dheph (2110), and generates a key exchange function (DHeph)(2010)(e.g., Diffie-Hellman key exchange) using the second algorithm (AA2), at step 3560. End point 2010 generates a message to send to end point 2110. The message format is, for example, [AA2pub (2010), Dheph(2010)]. AA2pub (2010) is the initiator's (2010) public key or corresponding digital certificate for the second algorithm (AA2).

At step 3570, end point 2110 calculates a variable DHssec from the Diffie-Hellman key exchange Dheph (2010), and sends end point 2010 its second authentication value (AA2-Auth(2010)).

The Diffie-Hellman key exchange provides forward secrecy, i.e., it ensures that a session key derived from a set of long-term public and private keys will not be compromised if one of the (long-term) private keys is compromised in the future. Incidentally, if the key is obtained by a hacker, any corresponding messages will not be compromised.

At step 3580, end point 2010 verifies the second authentication value of end point 2110 in the manner illustrated in FIG. 4. If the authentication value does not verify, an authentication failure occurs and the process terminates. If the authentication value does verify, end point 2010 sends end point 2110 its second authentication value (AA2-Auth (2010)) and computes sessions keys as described below.

Upon receiving the second authentication value of end point 2010, at step 3590, end point 2110 verifies the second authentication value in the manner illustrated in FIG. 4. If the authentication value does not verify, an authentication failure occurs and the process terminates. If the authentication value does verify, end point 2110 computes sessions keys as described below.

The real-time data stream is encrypted with a key stream (i.e., session keys), generated using a first symmetric algorithm (SA1) and then a second symmetric algorithm (SA2). For example SA1 can be RC4 and SA2 can be AES in CTR mode.

In one embodiment of the invention, SA1 is replaced by a null algorithm, such that encryption with any key gives that same encrypted text as the plaintext input, and encryption gives the same decrypted text as the input.

The key stream is initialized, as follows, for example, for a 248 bit key: A's downlink and B's uplink:
$K_{SA1}$=Bytes 0 to 31 from PRF(SSEC2)
$K_{SA2}$=Bytes 0 to 31 from PRF(SSECI)
$IV_{SA2}$=Bytes 32 to 47 from PRF(SSECI)
A's downlink and B's uplink:
$K_{SA1}$=Bytes 32 to 63 from PRF(SSEC2)
$K_{SA2}$=Bytes 48 to 79 from PRF(SSECI)
$IV_{SA2}$=Bytes 80 to 95 from PRF(SSECI)

PRF denotes a pseudorandom function. The shared secrets, SSEC1 and SSEC2 are computed, as follows:
SSEC1=H2 ($N_A$ concatenated with $N_B$),
SSEC2=Double_hash(SSEC1 concatenated with Double_hash($DH_{ssec}$)),
where Double_hash(X)=Cyclic-XOR (H2 (X), H3 (X))) and H2 and H3 are different digest algorithms, for example SHA-512 and MD5. $N_A$ is the random number generated by the initiator end point and $N_B$ is the random number generated by the receiver end point.

In another exemplary embodiment, SSEC1=NULL, and only 1 secret key is used to initialize a key stream.

In other embodiments of the invention, the approach is generalized to create more than two shared secrets.

The communications between end points 2010 and 2110 are encrypted using the computed sessions keys.

When end point 2110 is a gateway, the gateway uses the same asymmetric keys (A pub, A priv) to authenticate itself in all calls.

In another exemplary embodiment, the gateway has a database that stores a set of asymmetric key pairs associated with each secure phone number or trusted range that it serves. When the gateway receives or makes a call using a secure phone number, it finds the corresponding asymmetric key pairs from the database and uses them in the protocol illustrated in FIG. 3.

Furthermore, before an encrypted path between two end points or between an end point and gateway (e.g., end point 2010 and gateway 2111) in the communication system can be established, mutual authentication must occur (e.g., between the device of end point 2010 and gateway 2111) as described in FIG. 3.

In another exemplary embodiment, the communication system provides distributed and 2-factor authentication, for example, to a telephony service, such as a conference bridge, in the telephony infrastructure. The telephony service has a database that contains a white list of the CallerIDs who may use the service. When setting up a call to the service, the gateway 2111 sends the CallerID to a PBX, which sends the CallerID to the telephony service. The service only allows access if the CallerID is in the database.

In another exemplary embodiment, the database could contain a black list of the CallerIDs that may not use the service.

Once the call is established, the telephony service can also use voice prompts to request additional authentication data, such as a PIN, from the caller. When the caller enters the PIN, the system sends it as a dual-tone multi-frequency (DTMF) signal, and the telephony service verifies the PIN. The DTMF tones are encrypted between the end points. If verification fails, the telephony service terminates the call, otherwise, an end point (e.g., end point 2010) can communicate with another end point (e.g., end point 2110) in the communication system using DTMF.

End point 2010 can call a conference service, and respond to voice prompts from the conference service using DTMF signals to select a conference room and input a pin to authenticate the caller. In this case, the end point encodes DTMF signals in the media traffic and the gateway decodes them and transmits them in a standard way to a PBX.

The system encodes DTMF signals in frames that replace standard codec frames (as described below). In this way, encrypted DTMF signals can be mixed arbitrarily with encrypted voice traffic.

An end point encodes voice data using a modification to a standard rate-adaptive codec, such as Adaptive Multi-Rate audio codec (AMR). The modification reduces the bandwidth required to transmit the data from the standard codec. The system negotiates the codec rate on a per-call basis and uses this knowledge to reduce the data transmitted in each codec frame.

When an end point registers, the registration message contains a protocol version field, which contains an encoding of the codec rate or rates that the end point can use. The signaling server determines which codec rate the end points on a call can use and notifies each end point of the choice in protocol messages.

In another exemplary embodiment, the end points negotiate the codec end-to-end rate at the beginning of the session. In this case, both end points know the rate of a multi-rate adaptive codec to use in a call between them without the signaling server being involved, and therefore, the end points can remove the header component from ail of the frames.

To reduce the bandwidth used, an end point (e.g., end point 2010) removes the header data from a standard codec frame that contains the rate information before sending the frame to the other party on a call. The other end point of the call (e.g., end point 2110) adds the equivalent standard codec data to each modified frame when it receives it.

In an exemplary embodiment, end point 2010 forms a packet that comprises multiple modified frames concatenated and transmits the concatenated frames to the other party on the call.

In another exemplary embodiment, the standard codec rate is determined by run length encoding. This method reduces bandwidth since an end point is only notified when the speed changes.

The authentication process to access a telephony service can be distributed in more than one place (e.g., the gateway, PBX and the service). If these functions are physically separated, then it would be necessary to compromise all of them to compromise the authentication process.

In another exemplary embodiment, when a call is established, an end point can compute a code that is unique to that call. In the case that both end points on the call are mobile phones, each can display the code to the user. One caller can read the code to the other, who can confirm it is the same code that displayed on his phone.

The code can be derived from the computed session keys, for example, using a digest function.

In the case when one end point is a gateway, the gateway can compute the code and pass it to a PBX, which can relay the code to an end point in the communication system, such as a phone. The phone could display the code, thereby allowing the callers to confirm their codes.

In a similar manner, the gateway could transfer a non-verbal message that it had received securely from a mobile end point to communication system.

Figure 5:
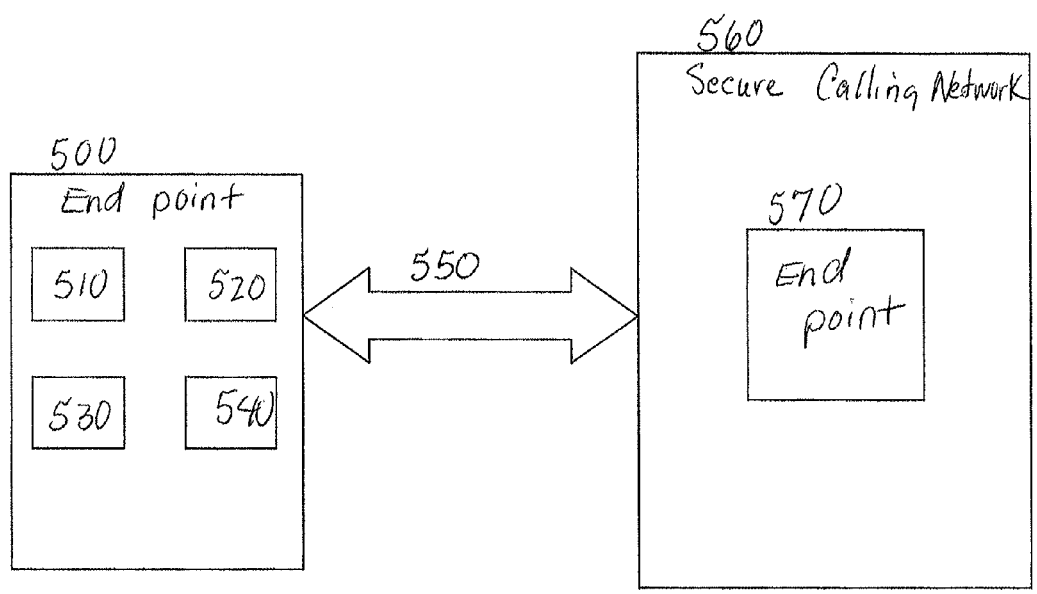
FIG. 5 is a block diagram illustrating secure calling from a Code Division Multiple Access (CDMA) enabled end point.

FIG. 5 illustrates secure calling from Code Division Multiple Access (CDMA) enabled end points. End point 500 is a CDMA mobile end point which includes mobile equipment (e.g., mobile phone equipped with encryption modules). The mobile equipment includes a speaker 530, a microphone 540, a button 510 and a secure telephony application 520. The secure telephony application 520 uses simplex audio communications, where the user presses button 520 on the handset to speak.

When button 510 is depressed, the application 520 ceases to playback received audio over secure communication channel 550 to an end point 570 in a secure calling network 560 and transmits recorded audio from the microphone 540.

When the button 510 is not depressed, the application 520 plays to the speaker 530 the received audio from the secure communication channel 550 to an end point 570 in the secure calling network 560 and ignores audio from the microphone 540.

In another exemplary embodiment, when the button 510 is depressed, application 520 sends a message down the encrypted call channel to end point 570. When end point 570 receives this message, it does not transmit audio to end point 500 and application 520 transmits recorded audio from microphone 540 to end point 570.

In another exemplary embodiment, it is possible to depress one of a set of buttons where each button sends a different message down the encrypted call channel. When receiving the message, end point 570 displays text or an icon depending on which button is depressed. For example, end point 570 displays the text, for example, "in duress" in response a message received from a button programmed to indicate duress.

As disclosed herein, embodiments and features of the invention can be implemented through computer hardware and/or software. Such embodiments can be implemented in various environments, such as networked and computing-based environments. The present invention is not limited to such examples, and embodiments of the invention can be implemented with other platforms and in other environments.

Moreover, while illustrative embodiments of the invention have been described herein, further embodiments can include equivalent elements, modifications, omissions, combinations (e.g., of aspects across various embodiments) adaptations and/or alterations as would be appreciated by those skilled in the art based on the present disclosure.

What is claimed:

1. A method of establishing a multiplicity of shared secrets at two mutually-authenticated end points in a network, comprising the steps of:
generating, by each point, a first public key ($AA1_{pub}$), and a first private key ($AA1_{priv}$) for a first algorithm (AA1), a second public key ($AA2_{pub}$) and a second private key ($AA2_{priv}$) for a second algorithm (AA2), a DeviceID and a PeerID, at a predetermined time period;
generating a random number value for each call;
calculating, by each end point, a first authentication value (AA1-Auth) corresponding to the first public key and the first private key and a second authentication value (AA2-Auth) corresponding to second public key and the second private key;
initiating a mutual authentication process by generating a message, by an initiator end point, and sending the generated message to a receiver end point in the network;
authenticating, by the initiator end point, the receiver end point based on the first authentication value of the receiver end point;
authenticating, by the receiver end point, the initiator end point based on the first authentication value of the initiator end point, if said authentication performed by the initiator end point is successful;
generating, by the receiver end point, a key exchange function ($DH_{eph}$) using the second algorithm (AA2), if said authentication performed by the receiver end point is successful;
calculating, by the initiator end point, a shared secret (DHssec) from the key exchange function ($Dh_{eph}$) generated by the receiver end point;
generating, by the initiator end point, a key exchange function ($DH_{eph}$) using the second algorithm (AA2); and
calculating, by the receiver end point, a shared secret (DHssec) from the key exchange function generated by the initiator end point.

2. The method of claim 1, further comprising the steps of:
authenticating, by the initiator end point, the receiver end point based on the second authentication value of the receiver end point;
authenticating, by the receiver end point, the initiator end point based on the second authentication value of the initiator end point, if said authentication performed by the initiator end point is successful, otherwise terminate.

3. The method of claim 2, further comprising the steps of:
computing session keys, by the initiator end point using the shared secret calculated by the initiator end point, if the authentication of the receiver end point by the initiator end point based on the respective second authentication value is successful,
computing session keys, by the receiver end point, using the shared secret calculated by the receiver end point, if the authentication of the initiator end point by the receiver end point based on the respective second authentication value is successful.

4. The method of claim 3, further comprising the step of:
calculating multiple shared secret keys, wherein at least one shared secret key is calculated from DHssec.

5. The method of claim 4, wherein the computed session keys are calculated from the calculated multiple shared secret keys.

6. The method of claim 1, wherein a terminate process occurs if any performed authentication is unsuccessful.

7. The method of claim 3, wherein a terminate process occurs if any performed authentication is unsuccessful.

8. The method of claim 1, wherein shared secret (DHssec) is generated only when the performance of all authentications are successful.

9. The method of claim 3, wherein mutual authentication succeeds only when parties receive all the messages the other party has sent and in the same order.

10. The method of claim 3, wherein the authentication succeeds only when the device's PeerID matches a value stored in a trusted contact database and a digital signature verifies the contact using one or more corresponding public keys.

11. The method of claim 7, wherein the PeerID is generated using a random number generator.

12. The method of claim 7, wherein the PeerID is derived from a public key of an asymmetric cryptographic key pair that is generated by a corresponding end point.

13. The method of claim 1, wherein the key exchange function is a Diffie-Hellman exchange function.

14. The method of claim 1, wherein the first algorithm and the second algorithm are cryptographic algorithms.

15. The method of claim 14, wherein the first algorithm and the second algorithm are different.

16. The method of claim 14, wherein the first algorithm and the second algorithm are the same.

17. The method of claim 1, wherein a random number is generated multiple times during a call.

18. The method of claim 1, wherein messages sent during the authentication are resent from a buffer if any message is lost.

19. The method of claim 1, wherein the end points in the network are CDMA enabled end points.

20. The method of claim 1, wherein the end points include mobile equipment containing an application, button, speaker, and microphone.

21. The method of claim 20, wherein the mobile equipment contains a plurality of buttons.

22. The method of claim 21, wherein the plurality of buttons are designed to send a message when its corresponding button is depressed.

23. The method of claim 20, wherein the application ceases to playback received audio over a secure communication channel to an end point in a secure calling network when the button is depressed and transmits recorded audio from the microphone.

24. The method of claim 20, wherein the application plays to the speaker received audio to an end point in a secure calling network and ignores audio from the microphone when the button is not depressed.

25. The method of claim 18, wherein the messages are protected by forward secrecy.

26. The method of claim 1, wherein data is encoded using a modified standard rate adaptive codec.

27. The method of claim 26, wherein the codec rate is negotiated on a per-call basis.

28. The method of claim 27, wherein the end points negotiate the codec rate at the beginning of the session.

29. The method of claim 28, wherein a sending end point removes a header component from all data frames before data transmission and a receiving end point adds equivalent information when the data frames are received.

30. The method of claim 26, wherein the standard rate adaptive codec is determined by run length encoding.

* * * * *